United States Patent Office 2,809,273
Patented Oct. 8, 1957

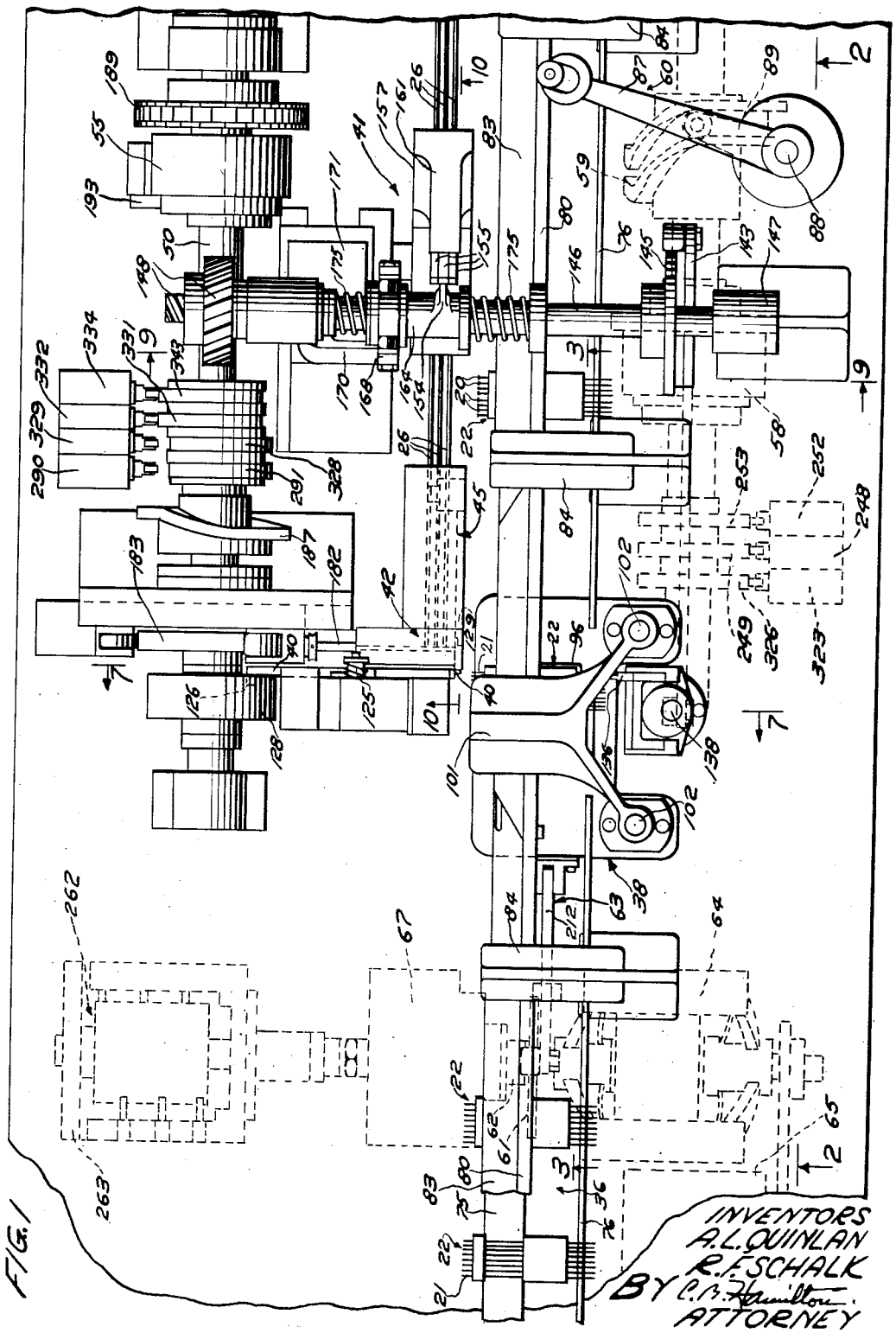

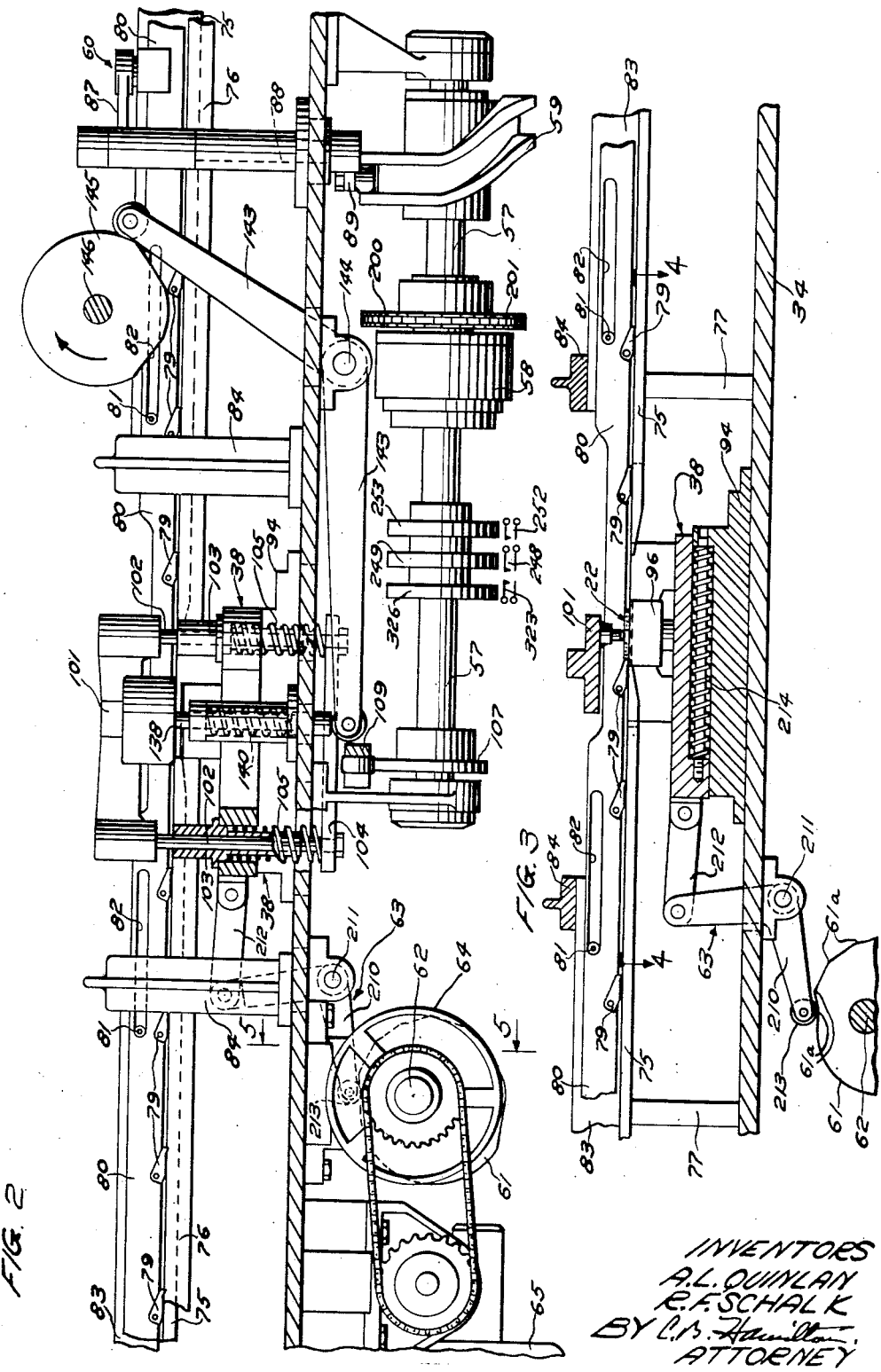

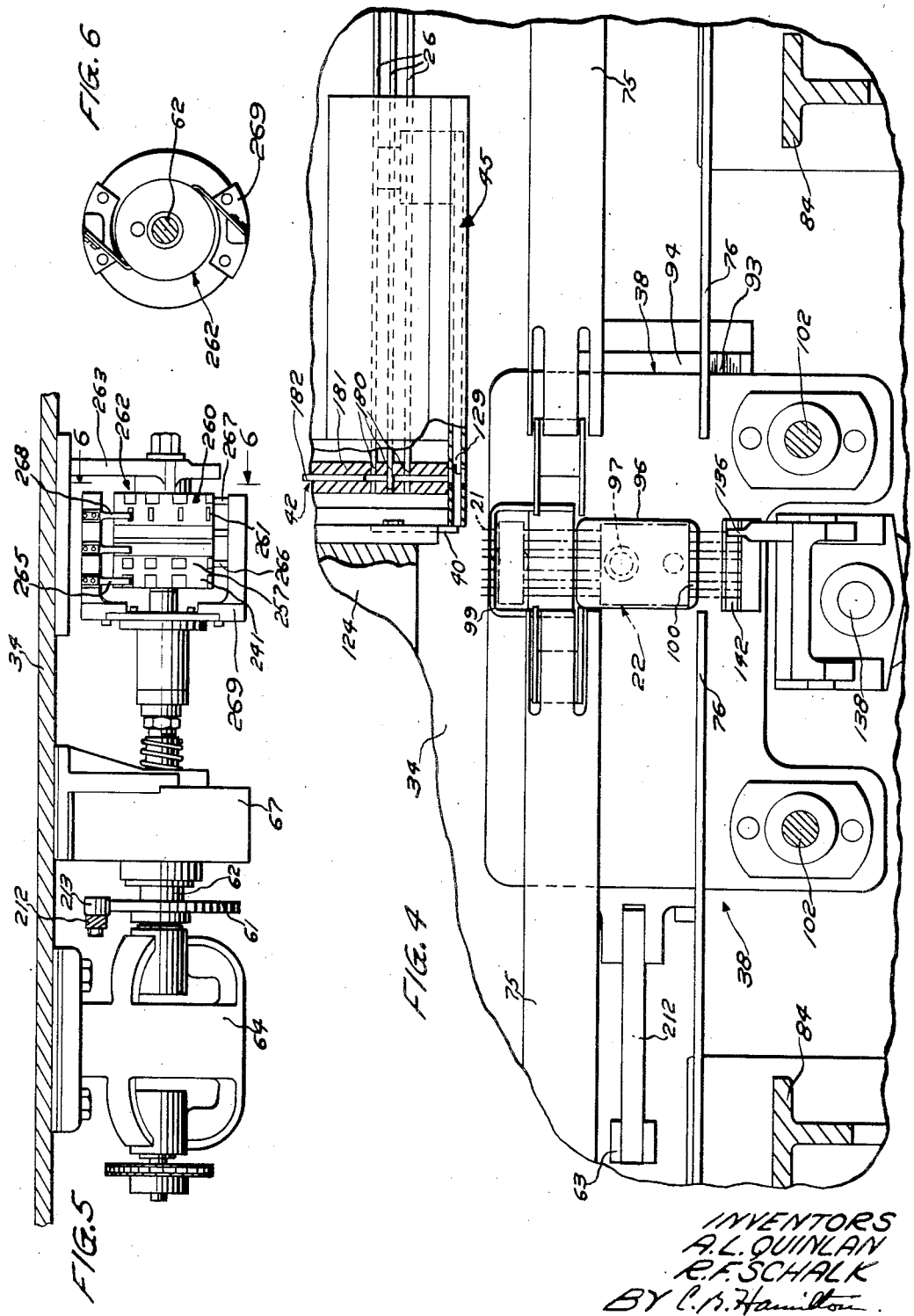

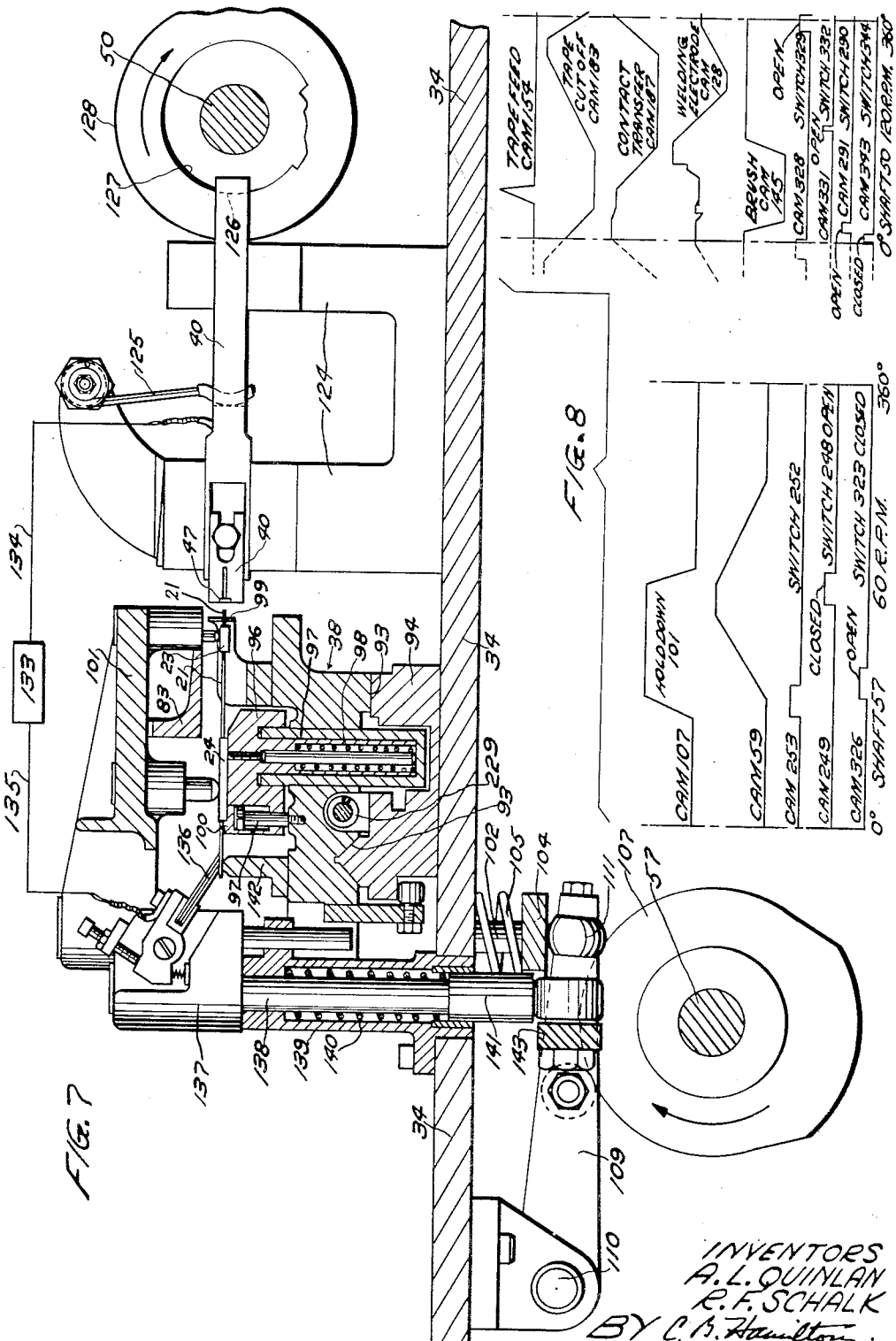

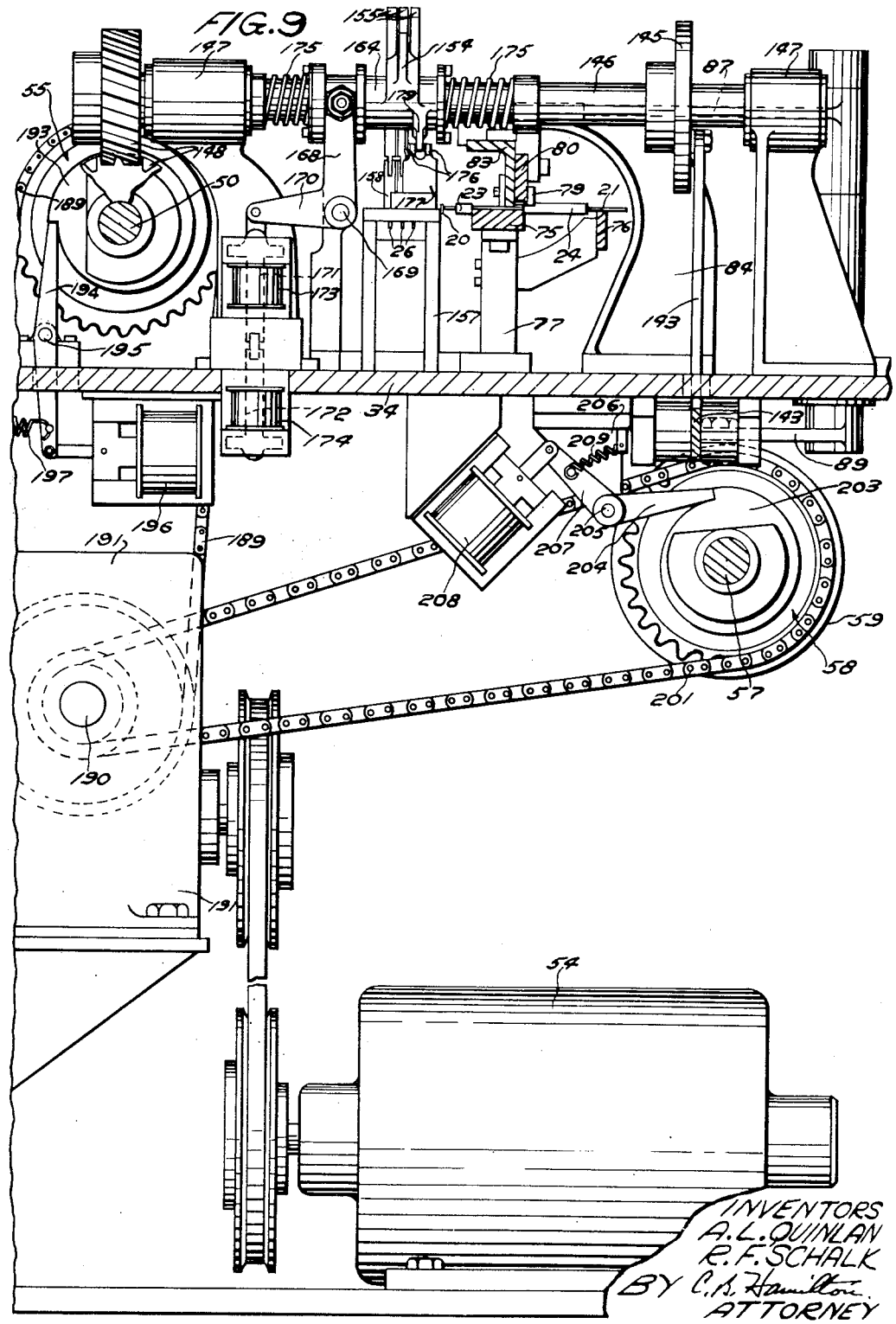

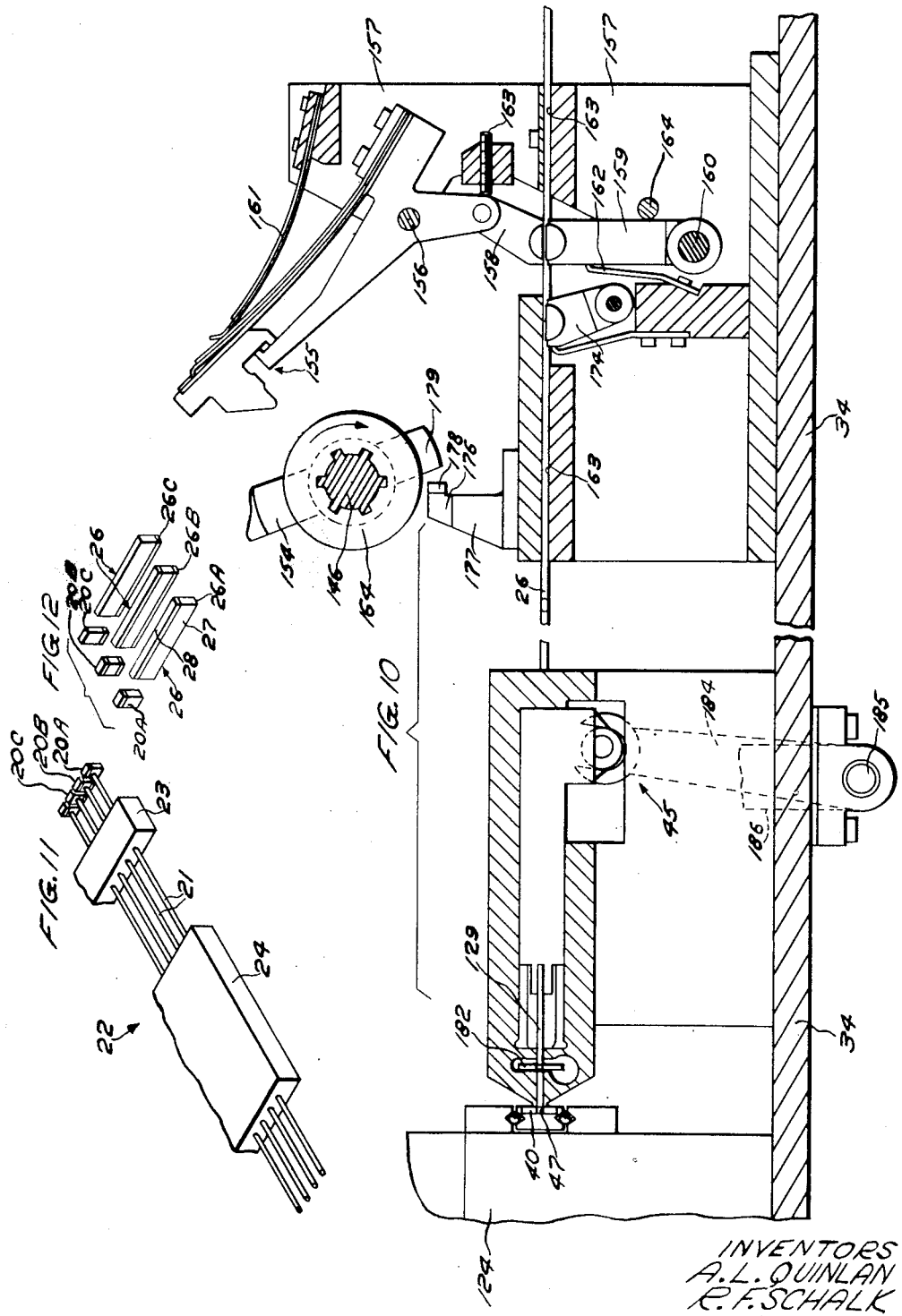

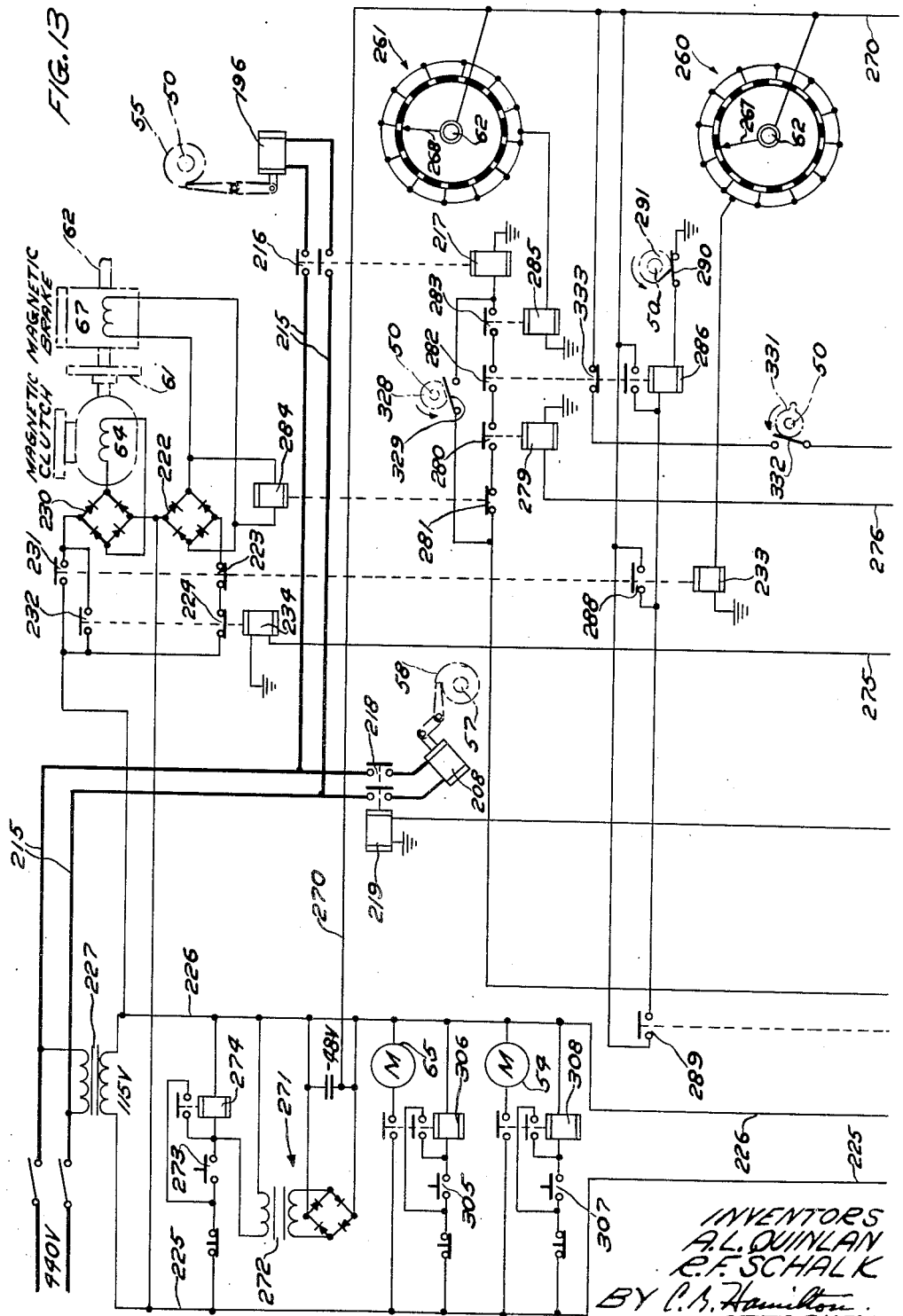

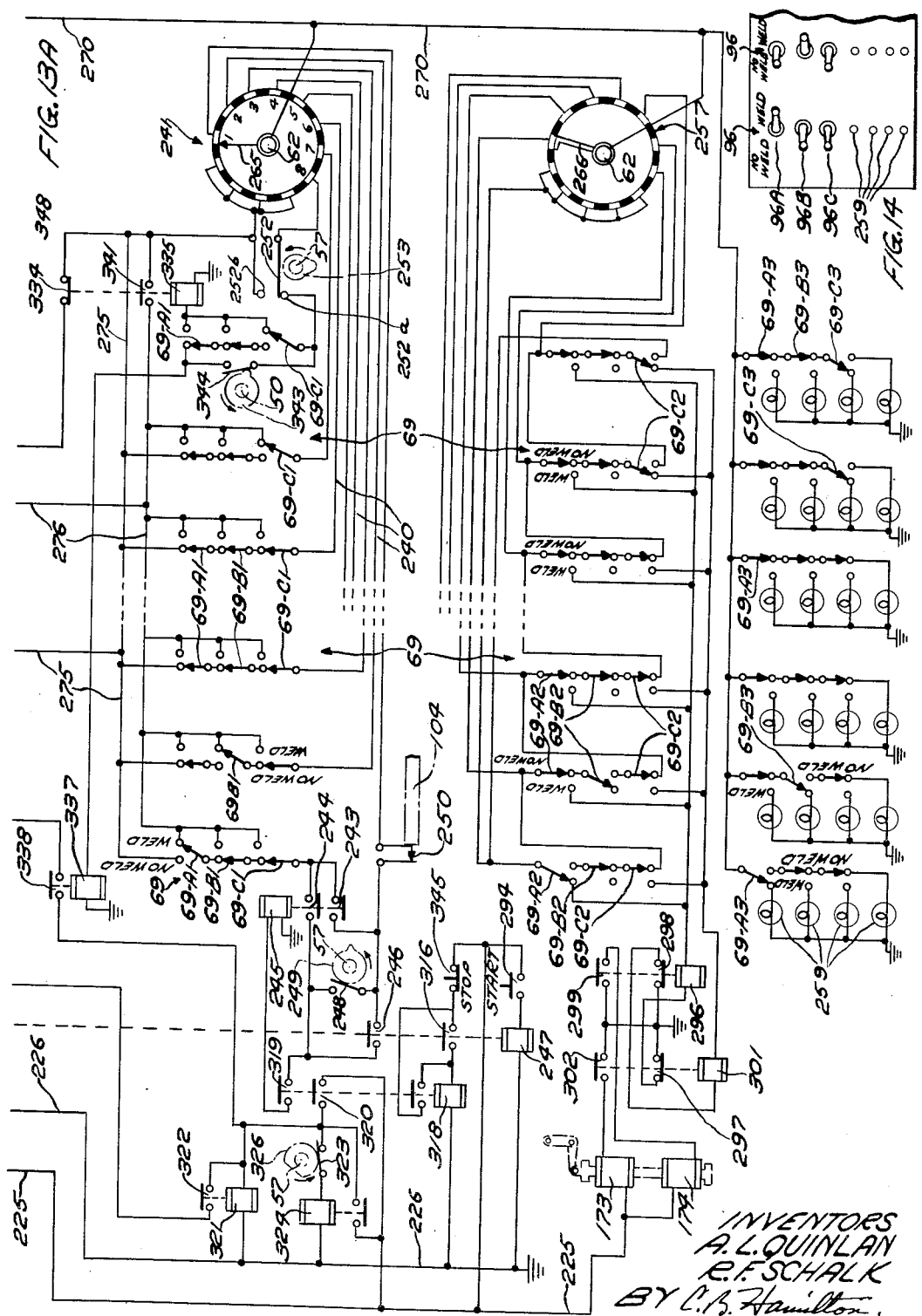

2,809,273

APPARATUS FOR SELECTIVELY FORMING AND WELDING CONTACTS ONTO ELECTRICAL COMPONENTS

Amos L. Quinlan, La Grange Park, Ill., and Robert F. Schalk, Madison, Wis., assignors to Western Electric Company, Incorporated, New York, N. Y., a corporation of New York Application January 31, 1956, Serial No. 562,405

11 Claims. (Cl. 219—79)

This invention relates to apparatus for selectively forming various types of contacts and selectively welding these contacts onto selected conductors of a relay part.

This invention is an improvement of the welding apparatus disclosed in the co-pending application, Serial No. 347,335, filed April 7, 1953, now Patent No. 2,749,419, issued June 5, 1956, and is also related to co-pending applications, Serial Nos. 562,387 and 562,388, filed concurrently.

An object of the present invention is to provide an apparatus for forming and selectively welding contacts onto predetermined conductors of an electrical component.

Another object of the invention is to provide an apparatus for selectively forming different types of contacts and selectively welding them onto predetermined conductors of a relay part.

An apparatus illustrating certain features of the invention may include a tape feeding mechanism for individually advancing different kinds of contact tape into a tape shearing mechanism for shearing contacts therefrom and moving them into the path of a transfer mechanism for transferring the contacts to a reciprocable welding electrode which moves the contacts individually into impact engagement with selected wires of a relay part positioned in its path to effect the percussive welding of the contacts onto the wires. The tape feeding mechanism, tape shearing mechanism, contact transfer mechanism, and the welding electrode are actuated in a predetermined sequence by a drive shaft which is driven through one-revolution cycles.

The relay part is supported on a carriage which is advanced by a rotatable indexing cam into predetermined positions to locate successive wires on the relay part in a welding position in alignment with the welding electrode and the indexing cam is driven from a continuously operating drive through a magnetic clutch and is stopped by a magnetic brake. Control means are provided including a switch for each position of the carriage settable to different positions for effecting the selective energization and deenergization of the magnetic clutch and the magnetic brake and the indexing of the carriage to selected predetermined positions, and for effecting the actuation of the drive shaft when the carriage is at the selected predetermined positions to effect the forming of contacts and the welding of the contacts onto the selected wires of the relay part.

The tape feeding mechanism includes three tape feeding devices individually actuated by a cam which is normally aligned with the center tape feeding device and is shiftable into alignment with the other tape feeding devices to render the selected tape feeding device operable. Tape selector control means are provided including a switch for each position of the carriage, which switches are individually settable to different positions for rendering the selected tape feeding devices operative to feed selected types of tapes at the selected positions of the carriage. After the contacts have been welded onto the relay part the indexing mechanism returns the carriage to its first position and a conveyor is actuated to remove the relay part from the carriage and feed another relay part thereonto.

Other objects and advantages of the invention will become apparent by reference to the following detailed description and the accompanying drawings illustrating a preferred embodiment thereof, in which Fig. 1 is a fragmentary plan view of the welding apparatus;

Figs. 2 and 3 are fragmentary longitudinal vertical sectional views of the apparatus taken on lines 2—2 and 3—3, respectively, of Fig. 1;

Fig. 4 is an enlarged fragmentary plan sectional view of the apparatus taken on line 4—4 of Fig. 3;

Fig. 5 is a fragmentary vertical cross-sectional view of the apparatus taken on line 5—5 of Fig. 2 and showing the indexing shaft and the commutators thereon;

Fig. 6 is a detailed vertical sectional view showing the commutators and taken on line 6—6 of Fig. 5;

Fig. 7 is an enlarged vertical cross-sectional view of the apparatus taken on line 7—7 of Fig. 1;

Fig. 8 shows cam charts of the cams actuated by two shafts of the apparatus;

Fig. 9 is an enlarged vertical sectional view of the apparatus taken on line 9—9 of Fig. 1;

Fig. 10 is an enlarged fragmentary longitudinal vertical sectional view showing the tape feeding mechanism and taken on line 10—10 of Fig. 1;

Fig. 11 is an enlarged fragmentary perspective view of the relay part or article having a plurality of wires with contacts welded thereto by the apparatus of the present invention;

Fig. 12 is an enlarged fragmentary perspective view of three different types of contact tapes from which contacts may be formed;

Figs. 13 and 13A are schematic views of the electrical control system of the apparatus for selectively forming different kinds of contacts and welding them onto selected wires of the relay part; and Fig. 14 is a fragmentary view of the switch panel of the apparatus.

The present welding apparatus is designed for selectively welding contacts 20 onto the ends of all or selected wires 21 of a relay part or article 22 (Fig. 11). The wires 21 are disposed in a row in parallel and laterally spaced relation to each other and are secured in molded blocks 23 and 24 of dielectric material. The contacts 20 are sheared from tapes 26 of metal comprising a body 27 of base metal such as cupro-nickel and a cap or layer 28 of precious metal such as palladium bonded thereto. The tapes and contacts are of three types, A, B, C, one with the cap 28 bonded onto the bottom, one with the cap bonded onto the top, and one with the cap bonded onto top and bottom.

Generally, the apparatus comprises a frame having a horizontally disposed base plate 34 (Fig. 1) on which the various components are mounted, including a conveyor 36 for intermittently advancing the articles 22 individually onto a carriage 38 on which the articles are clamped with the first wire 21 thereof in welding position in alignment with a movable electrode or gun 40 (Figs. 4 and 7) for welding a contact 20 thereon. The tapes 26 are individually and selectively advanced by a tape feeding mechanism 41 into a tape shearing mechanism 42 which shears a contact 20 therefrom which contact is transferred by a transfer mechanism 45 into a notch 47 in the electrode.

The electrode 40 is operatively connected to and actuated by a main drive shaft 50 which is driven from a motor 54 (Fig. 9) through means including a solenoid actuated one-revolution clutch 55. The selective tape feed mechanism 41, the contact shearing mechanism 42, and the contact transfer mechanism 45 are also operatively connected to and actuated by the main drive shaft 50, whereby when the clutch 55 is tripped, the main drive shaft 50 is driven through one revolution and actuates the welding electrode 40, the selective tape feed mechanism 41, the contact shearing mechanism 42, and the contact transfer mechanism 45 in a predetermined sequence. A second shaft 57 is driven from the motor 54 through means including a solenoid actuated one-revolution clutch 58, and the conveyor 36 is operatively connected to and actuated by the shaft 57 through a cam 59 and linkage 60 to remove from the carriage the finished article 22 with the contacts 20 welded thereon, and to feed another unfinished article onto the carriage.

The carriage 38 is advanced to place successive wires 21 of the article 22 into welding position in alignment with the electrode 40 by an indexing cam 61 (Figs. 1, 2, and 3) fixed to an indexing shaft 62 and operatively connected to the carriage by suitable linkage 63. The indexing shaft is driven through a magnetic clutch 64 by a motor 65. A magnetic brake 67 (Fig. 5) is selectively energized to stop the cam 61 and the carriage 38 at predetermined positions to align selected wires 21 of the article in welding position in the path of the electrode 40.

A pre-selector control mechanism is provided including groups of switches 69 settable to various positions to complete various control circuits as the carriage is moved to different positions to effect in a predetermined sequence: (1) the operation of the clutch 64 and the brake 67 to selectively index the carriage 38 to predetermined positions to locate selected wires 20 in welding position in alignment with the electrode 40, (2) the selection of the desired type of tapes, 26A, 26B, or 26C, to be fed for forming the selected types of contacts 20 to be welded onto the selected wires 21 of the article 22, (3) the tripping of the one-revolution clutch 55 and the rotation of the main drive shaft 50 to effect the welding of the contacts 20 onto the selected wires 21 of the article, the feeding of the tapes 26, the cutting of contacts 20 therefrom, and the transfer of the contact to the electrode 40, and (4) the tripping of the one-revolution clutch 58 and the rotation of the shaft 57 to effect the removal of the finished relay part 22 from the carriage 38 and the feeding of an unfinished article 22 thereonto by the conveyor 36.

More specifically, the articles 22 are supported on a pair of rails 75 and 76 of the conveyor 36 (Figs. 1, 3, and 9), which are supported on brackets 77. The rail 75 engages the wires 21 between the blocks 23 and 24 of the article 22 and serves to prevent displacement of the article longitudinally of the wires 21. The articles 22 are advanced by feed pawls 79 carried on a reciprocable feed bar 80, which is supported by a plurality of rollers 81 riding in slots 82 in the feed bar. The rollers 81 are mounted on elongated stationary L-shaped frame members 83 which are supported by brackets 84 on the base plate 34. Reciprocation is imparted to the feed bar 80 by the cam 59 through the linkage 60 which is in the form of a lever 87 fixed to a vertical shaft 88 and connected to the feed bar 80 and a second lever 89 (Figs. 2 and 9) fixed to the rock shaft 88 and actuated by the cam 59.

The carriage 38 is mounted for horizontal reciprocable movement on the ways 93 of a supporting block 94 secured to the base plate 34. Mounted on the carriage for horizontal movement therewith is a holder 96 which is guided for limited vertical movement on the carriage by guide members 97 and is urged upwardly by a spring 98 to its normal upward position (Fig. 3) level with the rails 75 of the conveyor 36 for receiving an article 22 as it is advanced by the conveyor. The rails 75 and 76 are each formed in two sections which are spaced apart to provide clearance for the horizontal movement of the holder 96 as the carriage 38 is indexed. A hold down or clamping member 101 is mounted on the carriage 38 for horizontal movement therewith and for vertical movement relative thereto for clamping the article 22 onto the holder 96 and moving the article and the holder to a lower operative position with the first wire 21 of the article in alignment with the electrode 40. A slotted guide 99 on the carriage 38 (Figs. 4 and 7) engages the ends of the wires 21 of the article 22 to accurately position them on the carriage and a shoulder 100 on the holder 96 engages the end of the block 24 of the article 22 to support it against the impact of the electrode 40. The hold down member 101 is fixed to a pair of vertically disposed rods 102 which are slidable in tubular guides 103 on the carriage 38 and have a cross bar 104 secured to their lower ends below the base plate 34. Springs 105 encircling the rods 102 stress the bar 104 and the clamping member 101 for downward movement to clamp the article 22 on the holder 96 and to move them to their lower operative position. The hold down member 101 is moved upwardly by a cam 107 which is mounted on the shaft 57 and actuates a lever 109 which is pivoted at 110 and has a roller 111 engageable with the cross bar 104.

The welding electrode 40 (Fig. 7) is supported for horizontal reciprocable movement in a U-shaped member 124 secured to the base plate 34 and is stressed for forward movement toward the carriage by a spring 125 mounted on the member 124. A cam follower 126 formed on one end of the welding electrode 40 engages the internal cam surface 127 of a cam 128 on the shaft 50 and the cam 128 in cooperation with the spring 125 moves the electrode 40 to a loading position where a contact 20 is inserted in the recess 47 of the electrode by a transfer member 129 of the contact transfer mechanism 45. The electrode 40 is then backed off a little by the cam and advanced to cause the contact to bump against the transfer member and be firmly seated in the electrode, after which the transfer member is retracted and the electrode is advanced to a predetermined position and released, causing the spring 125 to rapidly advance it and carry the contact 20 therein into engagement with the end of the wire 21 with an impact to cause the contact 20 to be percussively welded to the end of the wire 21.

An electronic device 133 (Fig. 7) for supplying welding current is connected by a conductor 134 to the electrode 40, and by a conductor 135 to a brush 136 which is moved into engagement with the end of the wire 21 in alignment with the electrode 40 to supply welding current thereto, whereby when the contact 20 approaches the wire 21 an arc is produced which fuses the adjacent surfaces of the contact 20 and the wire 21 to weld them together as the contact is thrust against the wire. The brush 136 is mounted on the upper end of a rod 138 which is guided for vertical movement in a tubular guide 139 secured to the base plate 34. A spring 140 engaging the enlarged head 141 of the rod stresses the rod 138 and the brush 136 downwardly to move the brush into engagement with a wire 21 and clamp it against an anvil 142 on the carriage to establish a good electrical connection with the wire 21. The brush 136 is raised by a bell crank lever 143 (Fig. 2) pivoted at 144 and actuated by a cam 145 on a shaft 146. This shaft is journalled in bearings 147 and is driven from the shaft 50 through a pair of spiral gears 148 (Figs. 1 and 9).

The shaft 146 also actuates the tape feeding mechanism 41 and has an actuating member or cam 154 splined thereon for individually actuating levers 155 (Figs. 9 and 10) of three tape feeding devices, one for each of the three types of tapes 26. These levers 155 are pivotally supported on a pin 156 in a suitable frame 157 and have arms 158 pivotally connected thereto. The arms 158 engage the upper portion of the tapes 26 and cooperate with arms 159 pivotally supported on a pin 160 and engageable with the underside of the tape. Leaf springs 161 and 162 secured to the frame 157 move the levers 155 and the arms 159 to normal retracted positions in engagement with stops 163 and 164, respectively. As the cam 154 rotates, it actuates the lever 155 of the tape feeding device aligned therewith and causes the arm 158 thereof to grip the tape 26 against the arm 159 and advance the tape a predetermined distance into the tape shearing mechanism 42. The tapes 26 which are guided in suitable guideways 163 in the frame 157 are held against return movement by pivoted holding pawls 174.

The cam 154 has a hub portion 164 splined on the shaft 146 (Figs. 9 and 10) and the cam is shiftable into operative position in alignment with each of the three tape feeding devices by a shifting yoke 168 which is pivotally supported at 169 and has an integral actuating lever 170. This lever is pivotally connected to one end of a pair of interconnected cores 171 and 172 of a pair of solenoids 173 and 174 suitably mounted on the base plate 34. The actuating cam 154 is yieldably maintained by springs 175 in a normal middle position in alignment with the lever 155 of the middle one of the three tape feeding devices, and the cam 154 may be shifted to either side in alignment with the adjacent levers 155 by selective energization of the solenoids 173 and 174.

A pair of spaced lugs 176—176 (Figs. 9 and 10) which are formed on a block 177 secured to the frame 157, have beveled ends 178 and cooperate with a finger 179 on the hub of the cam 154 to guide the cam into three predetermined positions in accurate alignment with each of the selected tape feeding devices. This guide means supplements the cam shifting means to accurately position the cam 154 in its three positions to prevent more than one tape 26 being fed and more than one contact being formed at one time.

The tapes 26 are fed individually into apertures 180 in a die 181 (Fig. 4) of the tape shearing mechanism 42, and a punch 182 having a notch in the end thereof is actuated by a cam 183 (Fig. 1) on the shaft 50 to shear a contact from the tape and carry it in the notch into the path of the transfer member 129 which transfers the contact from the punch into the recess 47 of the electrode 40. The transfer member 129, which has a notched end for receiving the contact 20 sheared from the tape, is mounted for sliding movement in a suitable guideway and is connected to a lever 184 (Fig. 10) fixed to a shaft 185 which has a lever 186 engageable with a cam 187 (Fig. 1) on the main drive shaft 50 for actuating the transfer mechanism.

From the description thus far it will be seen that the welding electrode 40, the tape feeding mechanism 41, the tape shearing mechanism 42, and the contact transferring mechanism 45 are actuated in a predetermined sequence by the main drive shaft 50 so that in response to one complete revolution of the shaft 50 the electrode 40 is actuated to effect the welding of a contact 20 onto a wire 21 of the article 22, the tape feeding mechanism feeds a selected one of the three tapes a predetermined distance into the shearing mechanism, the shearing mechanism shears a contact therefrom, and the transfer mechanism transfers it to the welding electrode preparatory to welding it onto the next selected wire 21 of the article 22 during the next cycle of operation of the shaft 50.

The one-revolution clutch 55 (Figs. 1 and 9) through which the main drive shaft 50 is rotated has a driving element which is connected through a sprocket and chain connection 189 to a shaft 190 of a gear reducer 191 which is driven from the motor 54. The clutch 55 has a control member 193 provided with a shoulder which is adapted to be engaged by a trip lever 194 for actuating the one-revolution clutch to disengage its driving connection with the shaft 50. The trip lever 194 is pivotally supported at 195 on the base plate 34 and has a depending portion connected to the core of a solenoid 196 for disengaging the lever from the member 193 to effect a driving connection between the clutch and the shaft 50. A spring 197 urges the lever 194 into engagement with the periphery of control member 193 to engage the shoulder thereon, thereby disengaging the clutch and stopping the shaft after one revolution.

The shaft 57 for actuating the conveyor 36 is rotatable independently of the shaft 50. A driving member 200 of the clutch 58 (Figs. 1, 2, and 9) is connected through a chain and sprocket connection 201 to the drive shaft 190 of the gear reducer 191. A control member 203 of the clutch 58 has a shoulder which is adapted to be engaged and actuated by a trip lever 204 to disconnect the drive and stop the shaft 57 after one revolution. The lever 204 is pivotally supported at 205 on a bracket 206 secured to the underside of the base plate 34 and an extension 207 of the lever 204 is connected to the core of a solenoid 208 which may be energized to disengage the lever 204 from the control member 203 to establish a driving connection with the shaft 57. A spring 209 returns the lever 204 and yieldably maintains it in engagement with the control member 203.

The indexing shaft 62 (Fig. 5) is secured to the driven component of the magnetic clutch 64 and is rotatably supported in the housing thereof and in the housing of the magnetic brake 65 which are secured to the frame plate 34. The driving component of the magnetic clutch is continuously driven from the motor 65 to which it is connected through a suitable gear reducer and sprocket and chain connection. The indexing cam 61 (Figs. 2 and 3) on the shaft 62 has eight sloping cam surfaces and eight concentric dwell surfaces 61–a which cooperate with the linkage 63 to move the carriage 38 successively to the eight predetermined positions to accurately position successive wires 21 of the article 22 in welding position in alignment with the contact 20 in the electrode 40. The linkage 63 as shown herein is in the form of a bell crank lever 210 which is pivotally supported at 211 on the base plate 34 and is connected by a link 212 to the carriage 38. A cam follower 213 on the lever 210 rides on the cam 61 and rests on the concentric dwell surfaces 61–a when the carriage is accurately located in its different positions. A spring 214 stresses the carriage for movement to the left as viewed in Fig. 3 and cooperates with the cam 61 to return the carriage to its first position.

Referring now to the schematic wiring diagram of Figs. 13 and 13A, the solenoid 196 for tripping the one-revolution clutch 55 and controlling the operation of the main drive shaft 50, is connected to a 440-volt power line 215 through normally open contacts 216 of a relay 217. The solenoid 208 for tripping the one-revolution clutch 58 and controlling the operation of the shaft 57 is connected to the power line 215 through normally open contacts 218 of a relay 219. The magnetic brake 67 is connected through a rectifier 222 and normally closed contacts 223 and 224 to a pair of 110-volt power lines 225 and 26 of a transformer 227 connected to the power lines 215. The magnetic clutch 64 is also connected through a rectifier 230 and normally open contacts 231 and 232 to the power lines 225, 226. The contacts 223 and 231 are actuated by a relay 233 and the contacts 224 and 232 are actuated by a relay 234. The magnetic brake 67 is normally energized to hold the indexing shaft 62 against rotation and the magnetic clutch 64 is normally deenergized to disconnect the continuously operating motor drive to the indexing shaft 62, and in order to effect the rotation of the indexing shaft either the relay 233 or the relay 234 may be energized, causing one of the relay contacts 223, 224 to be closed to energize the magnetic clutch and one of the contacts 231, 232 to be opened to deenergize the magnetic brake.

Mounted in a suitable panel are eight groups of switches 69, one for each wire 21 of the article 22 and in each group there are three switches 69–A, 69–B, and 69–C correponding to the three types of contact tapes 26–A, 26–B, and 26–C. Each of the switches has three poles 69–A1, 69–A2, 69–A3, 69–B1, 69–B2, 69–B3, 69–C1, 69–C2, and 69–C3. Only six of the eight groups of switches 69 are shown in Fig. 13A for purposes of simplifying the drawings. The switches 69 are movable to and from "weld" and "no-weld" positions and when in "no-weld" positions the switches of each group are connected in series with each other. The switch poles 69–A1, 69–B1, 69–C1 of the second, third, fourth, fifth, sixth, and seventh groups of switches are connected by conductors 240 to segments of a commutator 241. The switches 69–A1, 69–B1, 69–C1 of the first group are connectible to a segment of the commutator 241 through contacts 243 and 244 of a relay 245, contacts 246 of a relay 247, a switch 248 actuated by a cam 249 on the shaft 57, and a switch 250 which is actuated to closed position by the cross bar 104 of the hold down member 101 when the carriage 38 is in its first position. The switches 69–A1, 69–B1, 69–C1 of the eighth group are connected to a segment of the commutator 241 through a switch 252 which is actuated by a cam 253 on the shaft 57.

The groups of switches 69–A2, 69–B2, and 69–C2 are electrically connected to segments of a commutator 257 and serve to establish circuits for effecting the selection of the desired type of tape 26–A, 26–B, or 26–C from which contacts are to be formed in accordance with which switches 69–A, 69–B, or 69–C are set in "weld" position.

The switches 69–A3, 69–B3, and 69–C3 serve to connect power to lamps 259 to indicate which type of contact is to be welded on each of the wires 21 of the article 22 or if no contact is to be welded thereon.

The commutators 241, 257, and commutators 260 and 261 are assembled as a unit 262 (Fig. 5) which is stationarily supported in concentric relation to the indexing shaft 62 by a bracket 263 secured to the base plate 34. The commutators 241, 257, 260, and 261 have brushes 265, 266, 267, and 268, respectively, supported by a brush carrier 269 on the shaft 62 for rotation therewith, and these brushes are electrically connected to a power line 270 of a −48 volt direct current power supply 271 which is grounded to the power line 226. This power supply includes a transformer 272, the primary of which is connectible across the power lines 225, 226 by pressing a starting button 273 which completes the circuit and energizes a relay 274 for holding the circuit closed.

When the first group of switches 69 are set in their "no-weld" positions the switches 69–A1, 69–B1, and 69–C1 are connected through conductors 275 to the relay 234, which, when energized, effects the energization of the magnetic clutch 64, the deenergization of the magnetic brake 67, and the rotation of the indexing shaft 62 to index the carriage 38. When any of these switches are set to "weld" position they are connected through conductors 275 to a relay 279 for closing normally open contacts 280, which are connected in series with relay contacts 281, 282, and 283. These four relay contacts 280—283 form part of a circuit for energizing the weld control relay 217 and must be actuated to closed position before the relay 217 can be energized to close contacts 216 and cause the energization of solenoid 196, the tripping of clutch 55, and the rotation of the main drive shaft 50 to effect the welding of one contact 20 onto the article 22 and the forming and feeding of the next contact 20 to the electrode 40.

The contacts 281 of the four relay contacts in series are controlled by a relay 284 which is connected in parallel with the magnetic brake 67, and is energized to close the contacts 281 when the brake 67 is energized and holds the indexing shaft 62 against rotation. Thus, if the brake 67 is released, the solenoid 196 cannot be energized to trip the weld clutch 55. The contacts 283 are operated by a relay 285 in response to energization of the relay when the brush 268 of the commutator 261 contacts a segment of the commutator and completes a circuit through the relay. The segments of this commutator are relatively narrow and are positioned so that the brush 268 contacts one of them only when the cam 61 has been stopped by the magnetic brake with one of the concentric dwell surfaces 61a in engagement with the cam follower 213 of the lever 210. This insures that the carriage 38 is accurately located in all of its eight positions and that each of the wires 21 of the article 22 thereon when in welding position is in precise alignment with the contact 20 in the welding electrode 40. The contacts 282 are operated by a relay 286 which is energized and locks itself in by closing either one of a pair of normally open contacts 288 and 289 which are in parallel with each other and are connected between the line 270 and ground in series with the relay 286 and a normally closed switch 290. The switch 290 is momentarily opened by a cam 291 on the shaft 50 to deenergize the relay 286 during the early portion of each cycle of rotation of the shaft. The normally open contacts 288 in series with relay 286 are actuated to closed position in response to energization of the relay 233 and the normally open contacts 289 are closed in response to energization of the relay 247 which is accomplished by pressing a start button 294 to complete a circuit through the relay 247 from the power lines 225, 226.

When the switches 69–A are set to "weld" positions, the tape selecting switch poles 69–A2 of the switches are electrically connected in series with a relay 296, normally closed contacts 297, to ground. When the brush 266 provides power from the line 270 to energize the relay 296 it opens normally closed contacts 298 and closes normally open contacts 299 which completes a circuit from power line 225, tape selector solenoid 174, contacts 299, to ground, thereby energizing solenoid 174 and causing the shifting of the tape feed actuating cam 154 into position for feeding the contact tape 26–A. When the switches 69–B are set in "weld" positions, the switch poles 69–B2 close no circuits and the tape feed actuating cam 154 remains in its normal position for feeding contact tape 26–B. When the switches 69–C are set to "weld" positions, the switch poles 69–C2 are connected in series with a relay 301, the normally closed contacts 298, to ground, and when the brush 266 provides power from the line 270 to energize the relay 301, it opens the normally closed contacts 297 and closes the normally open contacts 302, thus completing a circuit from the line 225 through tape selector solenoid 173, contacts 302 to ground, to energize the solenoid 173 and effect the shifting of the tape feed actuating cam 154 into position for feeding the contact tape 26–C.

The motor 65 for operating the indexing mechanism is started by pressing a start button 305 to energize a relay 306 which locks itself in and connects the motor to a source of power, and the main drive motor 54 is started by closing a start button 307 to energize a relay 308 which locks itself in and connects the motor to a source of power.

After the motors 65 and 54 have been started, and with the carriage 38 and the relay part 22 in the first welding position, the operation start button 294 may be pressed to close a circuit to and energize the starting relay 247 for as long as the start button 294 is held closed, and thus start the operation of the welding apparatus. The starting relay 247 when energized closes the relay contacts 289, 246 and the contacts 316. The closing of contacts 289 causes the relay 286 to be energized and locked in and close its contacts 282 and open its contacts 333, and the closing of the contacts 316 by the starting relay 247 energizes relay 318 which locks itself in and closes its contacts 319 and 320. With the closing of contacts 246 and 319 by relays 247 and 318, respectively, the relay 245 is energized and its contacts 243 and 244 are closed, thereby connecting the power from the line 270 through brush 265, first segment of commutator 241, conductor 240, switch 250, contacts 243 to the first group of switches 69 from which the power may pass to either the indexing relay 234 or to the relay 279, depending on whether the switches are set to "weld" or "no-weld" positions. With the closing of the contacts 320 by relay 318 a timer 321 is energized to close contacts 322 after one-half second delay and this connects power to the contacts 280, 281.

282, and 283 and the welding relay 217 so that when all of these contacts are closed, the welding relay 217 is energized to initiate a cycle of operation of the shaft 50 and the contact forming and welding mechanisms associated therewith.

The closing of contacts 320 by the relay 318 also completes a circuit through a switch 323, and relay 324 to energize the relay and lock in the power circuit to the timer 321. A cam 326 on the shaft 57 serves to momentarily open the switch 323 to deenergize relay 324 and disconnect the power to the welding relay 217 at a predetermined point in the cycle of operation.

With the carriage 38 in the first position, if one of the switches of the first group of switches 69, as for example 69–A is in "weld" position, power from line 270 is supplied through commutator 241, switches 250, 69–C1, 69–B1, 69–A1, conductors 276, relay 279 to ground, thereby energizing relay 279 to close contacts 280. With the closing of the contacts 280 and with the contacts 281, 282, and 283 previously actuated to their closed positions, a circuit is completed from the power line 225 to energize the welding relay 217, thereby closing its contacts 216 to effect the energization of the clutch tripping solenoid 196 to initiate a cycle of rotation of the shaft 50 and thereby effect the welding of a contact 20 onto the first wire 21 on the article 22, the feeding of a contact tape 26, the shearing of a contact 20 from the tape, and the transfer of this contact to the electrode 40. A cam 328 on the shaft 50 closes a switch 329 connected in parallel with the contacts 280—283 shortly after the beginning of the cycle of rotation to keep the relay 217 energized regardless of the condition of the contacts 280—283, and the cam 328 opens the switch 329 shortly before the end of the cycle. The cam 291 momentarily opens the switch 290 shortly after the start of the cycle to deenergize the relay 286 and open its contacts 282.

Immediately after the contact 20 has been welded onto the wire 21 of the article 22, a cam 331 on the shaft 50 closes a normally open switch 332 to complete a circuit from line 270 through contacts 333 of the relay 286, switch 332, contacts 334, conductors 275, indexing relay 234, to ground, thereby energizing the indexing relay 234 to effect the release of the brake 67, the energization of the magnetic clutch 64, and the actuation of the indexing shaft 62. When the indexing shaft 62 starts to rotate, brush 267 is in the position it occupies after having disengaged itself from the preceding segment of the commutator 260, and this brush moves through substantially the first half step disengaged from the commutator segments and then engages a commutator segment and moves through the second half step in contact therewith. The cam 331 holds the switch 332 closed and the indexing relay 234 energized to keep the shaft 62 running for the first half step of indexing movement and at the end of the first half step the brush 267 engages a segment of the commutator 260 and completes a circuit to energize the other indexing relay 233 and maintain the magnetic brake 67 deenergized and the magnetic clutch 64 energized to keep the shaft 62 running for the second half step. At the end of the second half step the brush 267 has moved out of contact with the segment of commutator 260, and the indexing shaft 62, the carriage 38, and the article 22, are in the second position.

If the switches of the first group of switches 69 are in the "no-weld" position when the carriage 38 is in its first position, a circuit is completed from line 270, brush 265, first segment of the commutator 241, switch 250, contacts 243, switches 69–C1, 69–B1, 69–A1, conductors 275, relay 234 to ground, thus energizing the indexing relay 234 to effect the release of the magnetic brake 67, the energization of the magnetic clutch 64, and the rotation of the indexing shaft 62.

When the indexing shaft 62 starts to rotate, the brush 265 is in engagement with one edge of a segment of the commutator 241 and thus keeps the indexing solenoid 234 energized and the shaft 62 rotating for the first half step, during which the brush 267 is disengaged from the segments of commutator 260. Before the brush 265 disengages itself from the segment of the commutator 241, the brush 267 engages a segment of the commutator 260 and completes a circuit through the indexing solenoid 233 to keep the brake 67 released, the clutch 64 energized, and the indexing shaft 62 rotating for the second half step, at the end of which the indexing shaft 62, the carriage 38, and the article 22 are in the second position.

If none of the switches of the second group of switches 69 is in "weld" position when the carriage 38 is indexed to its second position, the brush 265 again completes a circuit to energize the indexing relay 234, thereby keeping the magnetic clutch energized, the magnetic brake released, and the indexing shaft 62 rotating during the first half step and at the end of the first half step brush 267 engages a segment of commutator 260 to energize the indexing solenoid 233 to keep the clutch 64 energized and the indexing shaft 62 rotating through the second half step and thus cause the carriage and the article 22 to be moved to the third position.

If one of the switches of the third group of switches 69 is in "weld" position when the carriage arrives at the third position, the brush 265 in engagement with the third segment of the commutator 241 completes a circuit through switches 69–A1, 69–B1, 69–C1 to energize relay 279 and close its contacts 280, which, if the contacts 281, 282, and 283 are closed, completes a circuit through and energizes relay 217. This initiates one cycle of operation of the shaft 50, thereby causing a contact 20 to be welded onto the wire 21 of the article 22, the feeding of a contact tape 26, the cutting of a contact 20 therefrom, and the feeding of the contact into the electrode 40. Immediately after the contact 20 has been welded onto the wire 21 the cam 331 momentarily closes the switch 332 to energize the indexing solenoid 234 and start the indexing shaft 62 turning. The cam 331 on the shaft 50 keeps the switch 332 closed and the indexing relay 234 energized to keep the shaft 62 rotating for the first half step at the end of which the brush 267 is in engagement with a segment of the commutator 260 and energizes the other indexing solenoid 233 to keep the magnetic clutch 64 energized, the brake 67 deenergized, and the indexing shaft 62 rotating for the second half step to effect the indexing of the carriage to the next position.

Indexing continues past positions with switches 69 in the "no-weld" positions by alternate operation of the indexing relays 233 and 234. When the carriage 38 reaches the next position requiring a weld, if the indexing movement is over a short span so that it is accomplished before the switch 329 opens, the relay 217 will remain energized and the shaft 50 will continue to turn without interruption through successive cycles to effect the forming of contacts and the welding of them onto successive selected wires 21 of the article 22. Otherwise, after the switch 329 opens, the shaft 50 will stop at the end of a cycle and wait for the next indexing movement. The cycle of operation of the shaft 50 starts again when the contacts 280—283 are all in their closed or operative positions.

While successive indexing and welding operations are taking place, the brush 266 of the commutator 257 supplies current sequentially through the switches 69–A2 and 69–C2 which are set in "weld" positions to relay 296 or relay 301 or to neither, depending on the position of the swithces and the type of contact 20 it is desired to form. The relays 296 and 301 operate the tape selector solenoids 173 and 174, respectively, which shift the tape feed cam 154 to either side from its normal position so that either tape 26–A or tape 26–C may be fed instead of the tape 26–B normally fed when neither solenoid is energized. The relays 296 and 301 are interlocked electrically so that when one is energized the other is released. This allows the brush 266 of the commutator 257 to be a make-before-break type obviating the necessity of allowing the solenoids to release and re-operate between adjacent welds requiring the same type of contact. The first group of switches 69–A2, 69–B2, and 69–C2 is electrically connected to the eighth commutator segment, the second group of switches is connected to the first commutator segment, the third group of switches is connected to the second commutator segment, etc. Thus, while the carriage 38 is at the first position and the brush 266 engages the first segment current is supplied to the second group of switches 69–A2, 69–B2, and 69–C2 to effect the selection of the type of tape from which will be sheared the contact which is to be welded onto the second wire 21 of the article 22 when the carriage moves to the second position. The groups of switches are interconnected so that when the brush 266 engages a segment connected to a group of switches in which none of the switches therein is set to "weld" position, a circuit is completed through successive adjacent groups of switches to the next switch which is set to "weld" position.

Indexing of the carriage 38 and the forming and welding of the contacts 20 onto the article 22 continue in the manner described until the carriage 38 moves into the eighth position where it will stop and wait until the switch 252 connected to the eighth segment of the commutator 247 is actuated. This switch has a normal position in engagement with switch contact 252a and is movable to another position into engagement with switch contact 252b. If the switches 69 of the eighth group of switches are set in "no-weld" position, they are connected in series and a circuit is completed from the line 270, brush 265, the eighth segment of the commutator 241, switch 252, contact 252a, the switches 69–C1, 69–B1, and 69–A1, a relay 337, to ground, thus energizing relay 337 and closing its contacts 338. This provides power from 110 volt line 225 to the relay 219 to energize it and effect the energization of the solenoid 208 and the initiation of one cycle of rotation of the shaft 57. As the shaft 57 rotates the cam 107 thereon causes the hold down member 101, the holder 96, and the article 22 thereon to be raised to the upper position, at which time the cam 253 on the shaft 57 actuates the switch 252 to its other position in engagement with the switch contact 252b to break the circuit to the switches 69–C1, 69–B1, 69–A1, and complete a circuit through the conductors 275 to the indexing solenoid 234 to energize the solenoid and effect the rotation of the indexing shaft 62 and the cam 61 through a half step of indexing movement to start the carriage 38 on its return movement to the first position. At the end of this half step the commutator 260 effects the energization of the indexing relay 233 and the indexing of the shaft 62 and the cam 61 through the second half step. The four segments between the eighth and the first segments of the commutator 241 are electrically connected to the indexing solenoid 234 and are sequentially engaged by the brush 247 and cooperate with commutator 260 to alternately energize the indexing relays 233 and 234 to turn the shaft 62 and cam 61 and cause the carriage 38 to be returned to the first position.

At substantially the same time the cam 253 actuates the switch 252 to start indexing, the cam 326 on the shaft 57 opens the switch 323 to deenergize relay 324 and remove power from relay 324 and timer 321, but as soon as the switch 323 closes, the relay 324 is ordinarily reenergized through contacts 320 of relay 318. As the shaft 57 continues to rotate the cam 59 thereon actuates the feed bar 80 of conveyor 36 to transfer the finished article 22 from the holder 96 and the carriage 38 and to feed another article 22 onto the holder 96, after which movement the cam 107 actuates the hold down member 101 to clamp the article 22 onto the holder 96 and move them to their lower operative position with the first wire 21 of the article in welding position in alignment with the welding electrode 40. The cam 249 on the shaft 57 momentarily closes the switch 248 to reenergize the relay 245 which had been deenergized when brush 265 left the first segment of the commutator 251 near the start of the apparatus operating cycle. Operation continues on from there the same as when the operation start button 294 was actuated. The carriage operated switch 250 is placed in series with switches 69–A1, 69–B1, 69–C1 of the first group to stop the apparatus in case the carriage 38 fails to follow the indexing cam 61 on the return stroke of the carriage to its first position.

If one of the switches in the eighth group of switches 69, as for example switch 69–C, is in the "weld" position when the carriage 38 is indexed into the eighth position, a circuit will be completed from line 270 through the brush 265, eighth segment of commutator 241, switch 252, switch 69–C1, the relay 335, to ground, thus energizing the relay 335 and causing it to open contacts 334 and close contacts 341. The closing of contacts 341 completes a circuit from the line 270 through eighth segment of commutator 241, switch 252, switch contact 252b, contacts 341, conductors 276 to relay 279, to energize this relay and close its contacts 282, thereby connecting power to and energizing the welding relay 217 to effect the energization of the solenoid 196 and the tripping of the clutch 55 so that the shaft 50 will be started or kept turning, whichever is necessary. At the start of each cycle of rotation of the shaft 50 a cam 343 thereon (Fig. 13A) momentarily closes a switch 344 connected in parallel with the eighth group of switches 69–A1, 69–B1, and 69–C1. When the carriage 38 is in the eighth position the closing of this switch 344 completes a circuit to energize the relay 337, thus closing the contacts 338 thereof and causing the energization of the relay 219 which effects the energization of the solenoid 208 and the initiation of a cycle of rotation of the shaft 57.

The shaft 57 rotates at a ratio of one to two relative to shaft 50, and the welding of the eighth contact 20 onto the eighth wire 21 of the article 22 occurs before the cam 107 on the shaft 57 effects the raising of the hold down member 101, the holder 96, and the article 22 to their upper positions and before the cam 253 on shaft 57 actuates the switch 252 to energize the indexing relay 234 and start the indexing shaft and cause the carriage 38 to be returned to the first position. As the shaft 57 continues to rotate the cam 59 actuates the feed bar to remove the finished article 22 from the carriage and feed an unfinished article 22 onto the carriage, the cam 107 actuates the hold down member 101 to clamp the article on the holder 96 and move them to their lower operative position with the first wire 21 of the article in welding position and the cams 326 and 249 actuates the switches 323 and 248, as explained hereinbefore, in the sequence indicated on the cam chart shown in Fig. 8.

If it is desired to weld a contact 20–A on the first wire, contact 20–B on the second wire, contact 20–C on the seventh wire, and contact 20–C on the eighth wire of the article 22, switch 69–A of the first group of switches 69, switch 69–B of the second group, switch 69–C of the seventh group, and switch 69–C of the eighth group are set to "weld" position, the other switches remaining in their "no-weld" position as shown in Fig. 13A. With the carriage 38 and the article 22 thereon in the first position and with a previously formed contact 20A in the welding electrode 40, the switch 69–A2 completes a circuit to shift the tape feeding cam 154 into a position to feed tape 26–B, and the switch 69–A1 in cooperation with the other components of the control system completes a circuit to energize relay 279 and thereby effect one cycle of operation of the shaft 50 and the contact forming and contact welding mechanisms. This causes the contact 20A, which was in the welding electrode 40, to be welded onto the first wire 21 of the article, and causes the forming of a contact 20B and the transfer thereof to the welding electrode, and the actuation of the switch 332 by cam 331 on shaft 50 to cause the carriage to be indexed to the second position and connect the second group of switches 69 to power line 270. Since the switch 69–B2 in "weld"

position completes no circuit, the tape actuating cam 154 remains in its normal position for feeding tape 26–B. Switch 69–B1 in its "weld" position completes a circuit to again energize relay 279 and thereby cause the shaft 50 to rotate through one cycle of rotation and effect the welding of the contact 20–B in the electrode 40 onto the second wire 21 of the article 22, the forming of the contact 20C for the seventh wire, the transfer thereof into the welding electrode, and the actuation of the switch 332 to start the indexing shaft.

Since no contacts are to be welded onto the third, fourth, fifth, and sixth wires and the switches 69 are set to "no-weld" position, the carriage will be indexed past these positions into the seventh position. In the seventh position the switch 69–C2 of the seventh group is in "weld" position and completes a circuit to effect movement of the tape feeding cam 154 into position to feed tape 26–C, and the switch 69–C1 of the seventh group completes a circuit to cause the shaft 50 to rotate through one cycle of operation and effect the welding of the contact 20–C in the electrode 40 onto the seventh wire of the article, the forming of a contact 20–C for the eighth wire 21 of the article 22, the transfer of the contact into the electrode, and the closing of the switch 332 to start the indexing mechanism and cause the carriage to be indexed to its eighth position. The switch 69–C of the eighth group is in "weld" position and completes a circuit causing the tape feed cam 154 to be shifted to a position for feeding the tape 26–A, and the switch 69–C1 is in "weld" position and completes a circuit to cause the shaft 50 to rotate through one cycle of operation and effect the welding of the contact 20–C onto the eighth wire of the article, the forming of a contact 20–A for the first wire of the next article 22, the transfer of the contact into the welding electrode 40, and the actuation of switch 344 by cam 343 on shaft 50. This causes the shaft 57 to be rotated through one cycle of rotation to effect the raising of the hold down member with the holder and the article 22 thereon, the actuation of the switch 232 to start the indexing mechanism and cause the carriage to be returned to its first position, the transfer of the finished article from the holder 96 and carriage 38 and the transfer of an unfinished article onto the holder 96 and carriage 38, and the movement of the hold down member, the holder, and the article 22 to their lower operative position with the first wire 21 of the article 22 in welding position in alignment with the welding electrode 40.

When stop button 345 is pressed, relay 318 is deenergized but the apparatus continues to operate until the operation is completed of welding contacts 20 onto the article 22 on the carriage at the time the stop button is pressed, and during the operation of the transfer shaft 57 as cam 326 thereon opens switch 323, power is removed from relay 324 and the circuit to the relay 245 is opened. With the relay 318 deenergized, reclosing of the switch 323 by cam 326 will not reenergize relay 324 and the apparatus comes to rest at the end of the cycle of rotation of the transfer shaft 57.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for selectively welding contacts onto elements of an article, means for supporting an article, a cam for advancing the article supporting means through predetermined operative positions to locate successive elements of the article in a welding position, a continuously operating drive means, a clutch for connecting the drive means to and disconnecting it from the cam, a brake for stopping rotation of the cam, means for simultaneously actuating the clutch and the brake to effect the rotation and stopping of the cam, means for welding contacts onto the elements of the article in the welding position, means for actuating the welding means, and control means including a plurality of switches settable to different positions for establishing control circuits in response to movement of the article supporting means to successive operative positions for selectively rendering said clutch and brake actuating means operable to effect the stopping of the article supporting means in selected ones of the operative positions for predetermined intervals and for selectively rendering the welding means operable to weld contacts during said intervals onto selected ones of the elements of the article.

2. In an apparatus for selectively forming and welding contacts onto conductors of an electrical component, a holder for supporting the electrical component; a rotatable cam for advancing the holder into a plurality of predetermined operative positions for locating successive conductors of the electrical component in a welding position; a continuously operating drive means; a magnetic clutch for connecting the drive means to and disconnecting the drive means from the cam; a magnetic brake for stopping the cam; means for welding contacts onto the conductor of said electrical component in said welding position; means for feeding a contact tape; means for shearing a contact from said tape; means for transferring the contact to the welding means; actuating means for actuating said welding means to weld a contact onto said article, for actuating said feeding means to feed a tape a predetermined distance, for actuating said tape shearing means to shear a contact therefrom, and for actuating said transferring means to transfer the contact to said welding means; and control means including a plurality of switches settable to different positions and a plurality of commutators movable in timed relation with the holder for establishing various control circuits in response to movement of the holder to said predetermined positions for selectively effecting the energization and deenergization of the magnetic clutch and the magnetic brake to stop the holder for predetermined intervals at selected ones of said predetermined positions and for rendering said actuating means operable in timed relation to the stopping of the holder at selected operative positions to effect the feeding of the tape, shearing of contacts therefrom, the transfer of the contacts to the welding means, and the welding of the contacts onto selected conductors of the electrical component.

3. In an apparatus for selectively welding contacts onto elements of an article, means for supporting an article, a shaft, a cam on the shaft having a plurality of sloping surfaces for advancing the article supporting means to a plurality of predetermined operative positions for locating the elements of the article successively in a welding position and having a plurality of concentric dwell surfaces for maintaining the article supporting means in said predetermined positions, a commutator having segments thereof angularly spaced around the shaft corresponding to the angular spacing of the dwell surfaces on the cam and having a brush mounted on the shaft for rotation therewith for engaging the segments when the dwell surfaces are operative to maintain the article supporting means in said operative positions, a continuously operating drive means, a magnetic clutch for connecting the drive means to and disconnecting it from the shaft, a magnetic brake for stopping the shaft, means for welding contacts onto the elements of the article at said welding position, means for actuating said welding means, and control means including the commutator and a plurality of switches settable to different positions for establishing various control circuits in response to movement of the article supporting means to successive operative positions for selectively energizing and deenergizing the magnetic clutch and the magnetic brake to effect the stopping of the article supporting means for predetermined intervals in selected ones of said operative positions and for selectively rendering said welding means operable to weld contacts during said intervals onto selected ones of the elements of the article, said commutator serving to render the control means and the apparatus inoperative when the article supporting means is improperly aligned in the said operative positions.

4. In an apparatus for selectively forming and welding contacts onto conductors of an electrical component, a reciprocable welding electrode for moving contacts into engagement with conductors of the electrical component; a holder for supporting the electrical component; a cam for advancing the holder through a plurality of predetermined positions to align successive conductors of the electrical component in a welding position in the path of the welding electrode; continuously operating drive means for rotating the cam; a magnetic clutch for connecting the drive means to the cam and for disconnecting it therefrom; a magnetic brake for stopping the rotation of the cam; means for feeding a contact tape; means for shearing a contact from the tape; means for transferring the contact to the welding electrode; means for electrically connecting the welding electrode and the conductor aligned therewith to a source of welding current; actuating means for actuating the tape feed actuating member to feed the tape a predetermined distance, for operating the tape cutting means to cut a contact from the tape, for actuating the transfer means to transfer the contact to the welding electrode, and for actuating the welding electrode to cause it to move a contact into impact engagement with the conductor aligned therewith to effect the percussive welding of the contact onto the conductor; and control means including a plurality of switches settable to different positions for establishing various control circuits in response to the movement of the holder to successive operative positions for effecting the selective energization and deenergization of the magnetic clutch and the magnetic brake to advance the holder to selected operative positions and stop it there for predetermined intervals, said control means also serving to render the actuating means operable to effect the feeding of the tape, the cutting of a contact therefrom, the transfer of the contact to the welding electrode, and the welding of the contacts to the selected conductor in timed relation to the stopping of the holder at each of the selected operative positions.

5. In an apparatus for selectively forming and welding contacts onto conductors of an electrical component, a reciprocable welding electrode for moving contacts into engagement with conductors of the electrical component; a holder for supporting the electrical component; a cam for advancing the holder through a plurality of predetermined positions to locate successive conductors of the electrical component in a welding position in the path of the welding electrode; continuously operating drive means for rotating the cam; a magnetic clutch for connecting the drive means to the cam and for disconnecting it therefrom; a magnetic brake for stopping the rotation of the cam, a plurality of tape feeding devices; a tape feed actuating element movable into predetermined positions for actuating the tape feeding devices individually; means for shifting the actuating element from one to another of the predetermined positions; means for shearing a contact from the tape; means for transferring the contact to the welding electrode; means for electrically connecting the welding electrode and the conductor aligned therewith to a source of welding current; actuating means for actuating the tape feed actuating member to feed a selected tape a predetermined distance, for actuating the tape cutting means to cut a contact from the tape, for actuating the contact transfer means to transfer the contact to the welding electrode, and for actuating the welding electrode to cause it to move a contact into impact engagement with the conductor aligned therewith to effect the percussive welding of the contact onto the conductor; and control means including a plurality of switches settable to different positions and a plurality of commutators rotatable with the cam for establishing various control circuits in response to the movement of the holder to successive operative positions for effecting the selective energization and deenergization of the magnetic clutch and the magnetic brake to advance the holder to selected operative positions and stop it for predetermined intervals, said control means also serving to render the element shifting means and the actuating means operable in a predetermined sequence relative to the stopping of the holder in selected operative positions to effect the selective shifting of the tape feed actuating element to selected tape feeding positions and to effect the feeding of the selected tape, the cutting of a contact therefrom, the transfer of the contact to the welding means, and the welding of the contact onto the conductor in timed relation to the stopping of the holder at each of the selected operative positions.

6. In an apparatus for welding contacts onto selected elements of an article, a carriage for supporting an article, a rotatable cam movable through successive steps for indexing said carriage to a plurality of predetermined positions to locate successive elements of the article in a welding position, means for welding contacts onto the elements of the article at said welding position, drive means, a clutch for connecting the drive means to the cam for rotating it, a brake for stopping the cam, means for actuating said clutch and said brake and for maintaining said clutch normally disengaged and said brake normally applied to stop said cam, a first commutator rotatable with said cam and connected to a current source during a first portion of each step of indexing movement of said cam, a second commutator rotatable with said cam and connected to said current source during the remainder of each step of indexing movement of said cam, a first control means electrically connectible to said first commutator for effecting the operation of said actuating means to release the brake and engage the clutch to cause the cam to rotate through the first portion of said steps of indexing movement, control means electrically connected to the second commutator for effecting the operation of said actuating means to release the brake and engage the clutch to cause the cam to rotate through the second portion of said steps of indexing movement, a second means connectible to said first commutator means for effecting the actuation of said welding means to weld a contact onto an element of the article in welding position, switch means for each of the predetermined positions of the carriage electrically connected to said first commutator and selectively settable to first and second positions, said switch means being effective in the first position to render said second means inoperative and said first means operative to effect the actuation of the cam through the first portion of the steps of indexing movement and said switch means being effective in the second position for rendering the first means inoperative and the second means operative to effect the actuation of said welding means to weld a contact onto the element in welding position, and means operable in response to actuation of the welding means for rendering said first means operative to effect the actuation of the cam through the first portion of a step of indexing movement.

7. In an apparatus for selectively welding contacts onto elements of an article, means for supporting the article, a cam capable of advancing the article supporting means through a predetermined path with a substantially continuous movement, drive means, a magnetic clutch for connecting the drive means to and disconnecting it from the cam, a magnetic brake for stopping the cam and the article supporting means at predetermined positions to locate successive elements of the article in a welding position, means for alternately energizing and deenergizing the clutch and the brake to effect the alternate rotation and stopping of the cam, means for welding contacts onto the elements of the article in the welding position, control means for each of the predetermined positions of the article supporting means including a switch selectively settable to first and second positions and effective in the first position for causing the deenergization of the clutch and the energization of the brake to stop the article supporting means in selected positions and for rendering the welding means operable to weld contacts onto the elements of the article stopped in the welding position and effective in the second position to render the welding means inoperative and to cause the deenergization of the brake and the energization of the clutch to rotate the cam and advance the article supporting means, and means responsive to the operation of the welding means at the selected predetermined positions for effecting the energization of the clutch and the deenergization of the brake to cause rotation of the cam and movement of the article supporting means.

8. In an apparatus for selectively welding contacts onto elements of an article, means for supporting an article, a cam capable of advancing the article supporting means with a substantially continuous movement through predetermined operative positions to locate successive elements of the article in a welding position, drive means, a clutch for connecting the drive means to and disconnecting it from the cam, means for actuating the clutch to effect the rotation and stopping of the cam, means for welding contacts onto the elements of the article in the welding position, means for actuating the welding means, and control means including a plurality of switches settable to different positions for establishing control circuits in response to movement of the article supporting means to successive operative positions for selectively rendering said clutch actuating means inoperable to effect the stopping of the article supporting means in selected ones of the operative positions for predetermined intervals and for selectively rendering the welding means operable to weld contacts during said intervals onto selected ones of the elements of the article.

9. In an apparatus for selectively welding contacts onto elements of an article, means for supporting an article, a cam capable of advancing the article supporting means with a substantially continuous movement through predetermined operative positions to locate successive elements of the article in a welding position, drive means, a clutch for connecting the drive means to and disconnecting it from the cam, means for actuating the clutch to effect the rotation and stopping of the cam, means for welding contacts onto the elements of the article in the welding position, means for actuating the welding means, control means including a plurality of switches settable to different positions for establishing control circuits in response to movement of the article supporting means to successive operative positions for selectively rendering said clutch actuating means operable to effect the stopping of the article supporting means in selected ones of the operative positions for predetermined intervals and for selectively rendering the welding means operable to weld contacts during said intervals onto selected ones of the elements of the article, and means for rendering said control means and said apparatus inoperative when the article supporting means is improperly aligned in the said predetermined operative positions.

10. In an apparatus for selectively welding contacts onto elements of an article, means for supporting an article, a cam capable of advancing the article supporting means through a predetermined path with a substantially continuous movement, drive means, a magnetic clutch for connecting the drive means to and disconnecting it from the cam, means for alternately energizing and deenergizing the clutch to effect the rotation of the cam and movement of the article supporting means to predetermined operative positions to locate successive elements of the article in a welding position, means for welding contacts onto the elements of the article in the welding position, control means for each of the predetermined positions of the article supporting means including a switch selectively settable to first and second positions and effective in the first position for causing the deenergization of the clutch to stop the article supporting means in selected ones of said predetermined positions and for rendering the welding means operative to weld contacts onto the elements of the article in the welding position and effective in the second position to render the welding means inoperative and to cause the energization of the clutch to effect the rotation of the cam and movement of the article supporting means, and means responsive to the operation of the welding means at the selected predetermined positions for effecting the energization of the clutch to cause rotation of the cam and movement of the article supporting means.

11. In an apparatus for selectively welding contacts onto elements of an article, means for supporting an article, a cam capable of advancing the article supporting means through a predetermined path with a substantially continuous movement, drive means, a magnetic clutch for connecting the drive means to and disconnecting it from the cam, means for alternately energizing and deenergizing the clutch to effect the rotation of the cam and movement of the article supporting means to predetermined operative positions to locate successive elements of the article in a welding position, means for welding contacts onto the elements of the article in the welding position, a plurality of control circuits individual to the operative positions of the article supporting means, means for sequentially rendering the circuits operative in response to movement of the article supporting means to the predetermined operative positions, switch means in the control circuits selectively settable to first and second positions and effective in the first position for causing the deenergization of the clutch to stop the article supporting means in selected ones of the predetermined operative positions and for rendering the welding means operative to weld contacts onto the elements of the article in the welding position and effective in the second position to render the welding means inoperative and to cause the energization of the clutch to effect the rotation of the cam and movement of the article supporting means, means responsive to the operation of the welding means at the selected predetermined operative positions for effecting the energization of the clutch to cause rotation of the cam and movement of the article supporting means, and means for rendering said control circuits and the apparatus inoperative when the cam and the article supporting means are improperly aligned in the said predetermined operative positions.

References Cited in the file of this patent

UNITED STATES PATENTS

| | | |
|---|---|---|
| 2,184,765 | Farley et al. | Dec. 26, 1939 |
| 2,401,722 | Clapp et al. | June 11, 1946 |
| 2,668,219 | Sandberg et al. | Feb. 2, 1954 |